United States Patent [19]

Presta

[11] 4,378,988

[45] Apr. 5, 1983

[54] ELEMENTS FOR BENDING PLATES MADE OF A MATERIAL IN THE PLASTIC STATE, USE OF SUCH ELEMENTS FOR BENDING AND HARDENING PLATES AND A DEVICE EQUIPPED WITH SUCH ELEMENTS

[75] Inventor: Claude Presta, Courbevoie, France

[73] Assignee: Saint Gobain Vitrage, Neuilly-sur-Seine, France

[21] Appl. No.: 268,054

[22] Filed: May 28, 1981

[30] Foreign Application Priority Data

Jun. 10, 1980 [FR] France ................................ 80 12851

[51] Int. Cl.$^3$ ............................................ C03B 23/023
[52] U.S. Cl. ..................................... 65/182.3; 65/273; 65/289
[58] Field of Search ....................... 65/182.2, 273, 289

[56] References Cited

U.S. PATENT DOCUMENTS

| | | | |
|---|---|---|---|
| 3,293,015 | 12/1966 | Fredley et al. ................. | 65/182.2 X |
| 3,375,093 | 3/1968 | Reising ....................................... | 65/25 |
| 3,375,094 | 3/1968 | McMaster et al. ............ | 65/182.2 X |
| 3,477,839 | 11/1969 | Misson ................................... | 65/273 |
| 3,545,951 | 12/1970 | Nedelec ............................ | 65/273 X |
| 4,311,509 | 1/1982 | Reader et al. .......................... | 65/273 |

FOREIGN PATENT DOCUMENTS 2221409 10/1974 France .
1190373 5/1970 United Kingdom .

Primary Examiner—Arthur D. Kellogg
Attorney, Agent, or Firm—Pennie & Edmonds

[57] ABSTRACT

An element for bending or hardening a movable plate in a plastic state. The element has a surface adapted to contact the plate where the surface has a plurality of bending profiles taken in a plane at right angles to the direction of movement of the plate. Means are provided to rotate the element in the plane in order to vary the radius of curvature of the surface contacting the plate.

19 Claims, 10 Drawing Figures

ELEMENTS FOR BENDING PLATES MADE OF A MATERIAL IN THE PLASTIC STATE, USE OF SUCH ELEMENTS FOR BENDING AND HARDENING PLATES AND A DEVICE EQUIPPED WITH SUCH ELEMENTS

TECHNICAL FIELD

The invention relates to curving or bending of plates made of a material in the plastic state and particularly sheets of glass at a temperature at least equal to the softening temperature of the glass. More specifically, the invention relates to elements which can be used as a mold for bending such sheets and to apparatus equipped with at least one such element. The invention also relates to the use of such elements for bending and/or hardening of the sheets.

BACKGROUND ART

The use of a number of bent rods as a bending mold is known where each of the rods is rotatable about an axis passing through its two ends and where each rod is covered by a tubular casing which is driven in rotation. By causing a sheet of glass heated to the plastic state to rest on a flat bed made up of such rods lying in the same longitudinal plane, it is possible, as described in U.S. Pat. No. 3,545,951, to impart a bending to the sheet by causing all the rods to simultaneously pivot to a common angle. Thus, when the bed formed by the bent rods ceases to be flat, the sheet of glass in the plastic state takes the approximately cylindrical shape imparted by all the raised, bent rods, either by sinking at its edges under its own weight or by sinking under the pressure of a counterform. It is possible to obtain sheets which are more or less bent in this manner, with the bending being nil when the rods all lie flat in one plane, the bending amounting to a maximum when all the rods are pivoted through a right angle with respect to the plane, and the bending being intermediate between those two extremes when the rods assume an intermediate inclination with respect to the plane.

In accordance with U.S. Pat. No. 4,054,438, it is also known that bending can be accomplished in a progressive manner by utilizing a shaping bed having progressive convexity with the bed being made up of similar shaped bent rods. The first rod in such a bed lies flat in the plane of the rollers which move the sheet to the bending station. The first rod is followed by intermediate rods which are fixed in progressively raised positions approaching the fixed position of the last rod in the shaping bed with the last rod imparting the desired degree of bending to the sheet. Thus, the sheet of glass is bent as it moves along, without any need to change the position of the rods, which are adjusted once and for all for production of sheets of a given radius of curvature.

In such installations, and particularly in the installation disclosed in the U.S. Pat. No. 4,054,438, the adjustments to change the radius of curvature are very easy and can be made rapidly. However the sheets of glass are only carried by bent rods which are spaced relatively far apart. Relatively large spacing between the rods is required in order to accommodate the means for varying the inclination of the rods by which the radius of curvature of the mold formed by the rods is changed. The result is that the sheets of glass acquire undulations which are perpendicular to their axes of bending and which consequently can interfere with visibility. To reduce the undulation effect, it is necessary to reduce the spacing between the various rods, but as explained above, this eliminates the possibility of varying the inclination of the rods and thus making adjustments in a wide range of radii of curvature of the mold formed by the rods.

When sheets of glass which are non-symmetrical in shape, i.e. trapezoidal in shape, or arranged asymmetrically with respect to the plane of longitudinal symmetry of the bending device are moved on the adjusted bent rods, a rotation of the sheets is produced which must be corrected in advance by arranging the sheets at an oblique angle to the direction in which they are moving before they contact the bent rods. Consequently, it is necessary to have ovens for reheating the glass which are larger than is strictly necessary, and the greater the difference between the length and the width of the sheets of glass, the greater is the size of the oven required. In some cases, it is impossible to obtain certain curvatures because of the size of the sheet.

There is another type of known bending device which provides glass of good optical quality, but it requires a very long operations time—a hundred or two hundred times as much as is required for the preceding devices—when a change in the radius of curvature of the glass sheet is desired. Such a device utilizes a shaper having a gaseous cushion formed by a multiplicity of blast plugs placed side by side. This device is well suited for bending of large amounts of sheets of glass having the same radius of curvature, but, on the other hand, it is not suited to producing short runs of sheets having different curvatures.

DISCLOSURE OF INVENTION

The present invention relates to a device for bending glass which combines the advantages of the two known systems described above—that is, it produces a glass of very good optical quality while easily lending itself to a changing of the radius of curvature to be imparted to the sheets.

To accomplish this purpose, an object of the invention is to provide for an element which can be used as a mold for bending or hardening a movable sheet made of a material in the plastic state where the element is intended to be located below the sheet at a right angle to its direction of movement and with the upper part of the element, which is used as a bending mold, having a multiplicity of profiles.

Another object of the invention is to provide for a device for bending or hardening a sheet made of a material in the plastic state with the device having means for moving the sheet and one or more bending molds where the device is of such a nature that at least one of the bending molds consists of at least one element, the upper surface of which comprises a multiplicity of profiles positioned in a plane at right angles to the direction of movement of the sheet and including means for bringing the desired profile of the element into contact with the sheet.

In one embodiment of the invention, the element which can be used as a bending or hardening mold comprises a part of a box which has means for blowing a gas on its side which faces the sheet to be bent or hardened such that the gas serves to support the sheet. The box may have a variable profile in a plane at right angles to the direction in which the sheet is moving or it may have a discontinuous profile formed with various sections, each of which has a different curvature. Preferably the box will have a profile which may rotate regularly with a continuous variable radius of curvature. Thus, it will be possible to cause the radius of curvature of the bending mold to vary by causing the box to rotate in a transverse vertical plane.

When a number of bending boxes are used, all the boxes can have the same profile and be side by side, with an offset in their rotation, if desired, depending upon whether the radius of curvature one desires to impart to the plastic sheet being treated remains constant or varies progressively in proportion as it progresses longitudinally. To produce a progressive transverse bend, one can also use a number of different boxes, close to each other and side by side, with or without an offset in their rotation.

In the same manner, several series of boxes can be used with the boxes of one series being identical but different from those in the following series, which can also be out of phase in rotation with respect to the former series.

It is also possible to use one or more boxes whose shape not only varies transversely but also in accordance with the direction in which the sheets to be treated are moving.

Finally, in all the foregoing cases, it is possible to arrange the successive boxes in accordance with a curve, in the direction of movement of the sheet which is to be treated, in order to offset the boxes vertically with respect to each other, so that bending of the sheet in the longitudinal direction of displacement will also be imparted.

In another embodiment of the invention, the element which can be used as a mold for the bending or hardening comprises a bent rod of the same type as the rods used in the devices described in the preceding patents which are surrounded by a tubular casing that is driven in rotation. The rods have a variable profile which is identical to that of the boxes and can be swung or rotated in a plane at right angles to the direction in which the sheet of glass is moving.

As a variation, the rods of a further embodiment may be located between the boxes or used in place of some of them.

Any means and particularly a series of laterally arranged holding lugs can be used as a means for driving a sheet to be treated. The holding lugs may preferably be adjustable, so that their position can be adapted to the shape of the sheet. The lugs will be adjusted once and for all for each series of sheets and the lugs and the sheets will appear with the same frequency.

The bending device unit will preferably be inclined laterally toward the series of lugs.

Bent rods surrounded by rotatable tubular casings having the same profile as the boxes and inserted between the boxes can also be used as a means of moving or driving a sheet.

As is described below in greater detail it is advantageous for boxes of the bending device of the invention to have a spiral profile—and particularly a logarithmic spiral profile—in a plane perpendicular to the direction in which the sheet to be treated is moving. An arc of short length of such a curve has a radius of curvature which varies sufficiently rapidly and progressively and a box having such a profile lends itself to easy and rapid changing of its radius of curvature. Naturally, the invention is not limited to boxes having that profile, but they constitute a preferred type of embodiment.

Finally uses of the bending boxes of the invention for bending and/or hardening plates made of a material in the plastic state, and particularly sheets of glass at a temperature at least equal to the softening temperature, constitute another object of the invention.

BEST MODE FOR CARRYING OUT THE INVENTION

Figure 1:
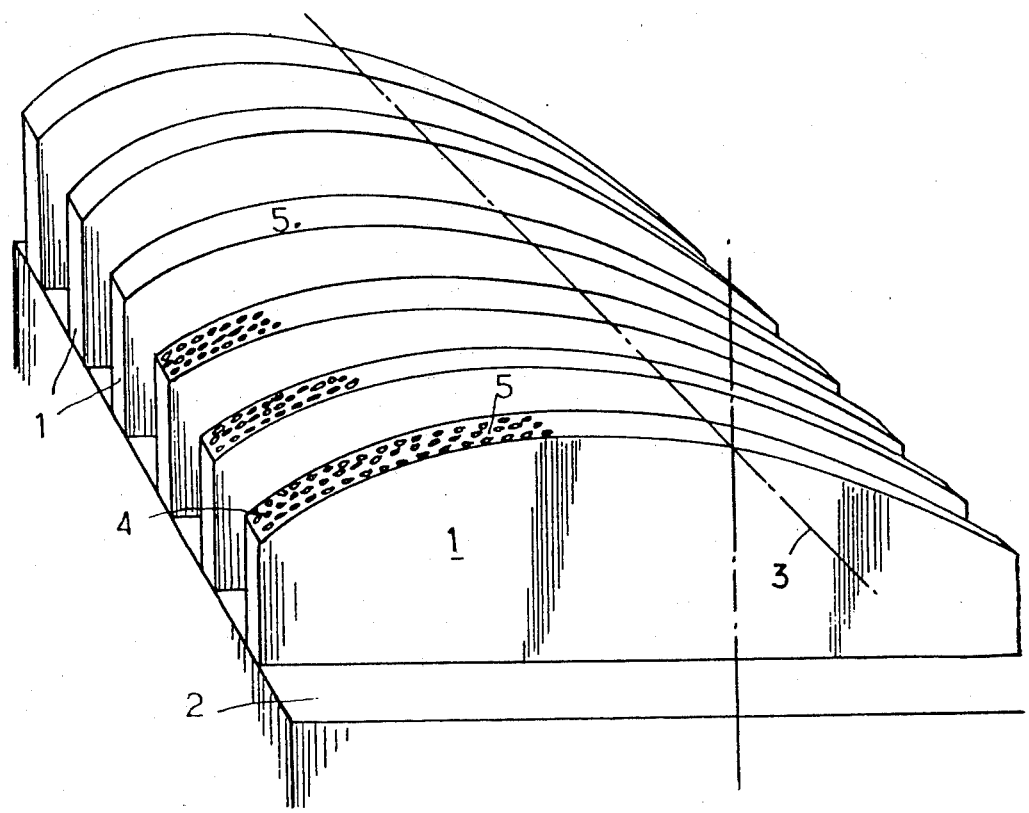
FIG. 1 illustrates a bending device equipped with boxes constructed according to the invention which are spaced from each other.

Referring to FIG. 1, there is illustrated a number of elements or boxes 1 supported by a single framework 2. The boxes are arranged perpendicularly to the path 3 of a plate made of a material in the plastic state i.e. a sheet of glass, for example, and blowing plugs or nozzles 4 are provided in the upper surface 5 of the boxes beneath the sheet, not shown, to direct a gas, air for example, against the lower side of the sheet such that it is supported on a gaseous cushion.

In conformity with the invention, the upper surface 5 of each element or box 1 has a curved profile whose radius of curvature varies continually from one end of an element to the other in a plane taken at right angles to the direction 3. Thus, it is possible to bring the part of the upper surface of the element which has a desired radius of curvature beneath the passage of a sheet to be bent by locating the element in a plane at right angles to its direction 3 along which the plates move from a reheating oven. It is also possible to cause the radius of curvature imparted to a sheet which is moved or driven by a series of lugs or other known means (not shown) to vary in an approximately continuous manner, by offsetting the identical elements of the bending unit laterally and in a progressive manner with respect to each other as the sheet progresses above the elements and perpendicularly to them.

Figure 2:
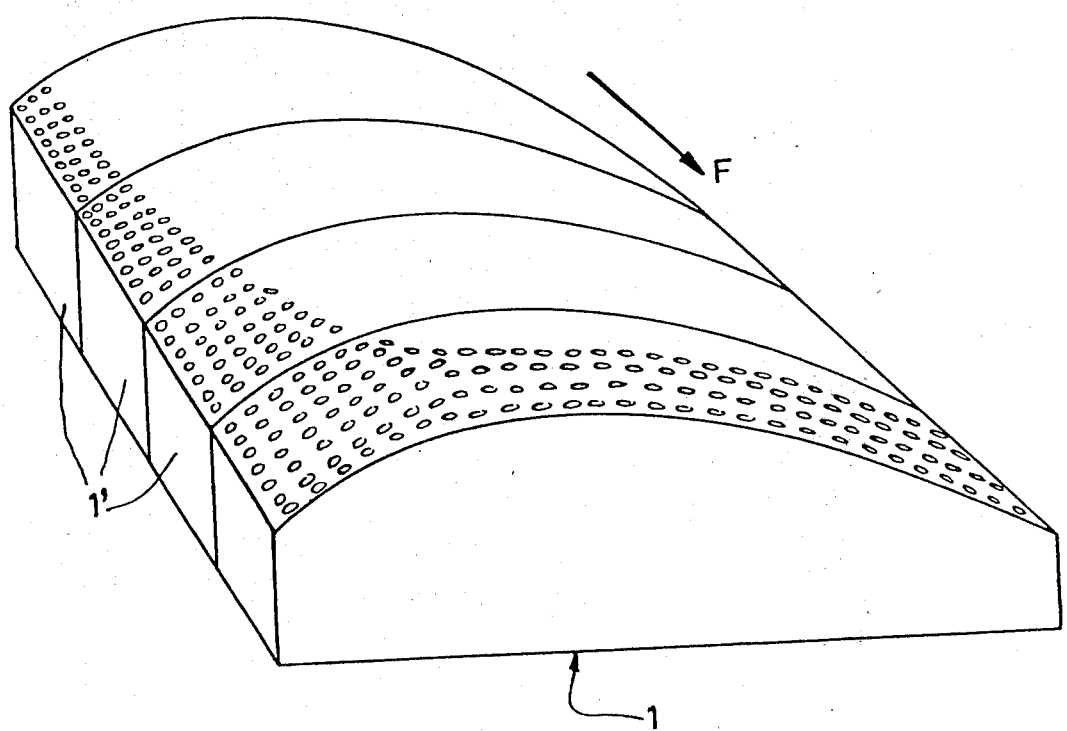
FIG. 2 illustrates a variant of the bending device shown in FIG. 1 in which the various boxes are joined and define a bending mold which can be compared to a single box.

In this embodiment of the device of the invention, however, there is a danger that the spacing of the elements will give rise to undulations in the sheet of glass, as is the case with devices having the adjustable bent rods used in the prior art. To remedy this disadvantage, the elements 1' are joined together side by side as shown in FIG. 2 to cause their profiles to vary regularly in accordance with the direction of movement F of the sheet being treated so that elements 1' in effect form a single, continuous box.

Figure 3:
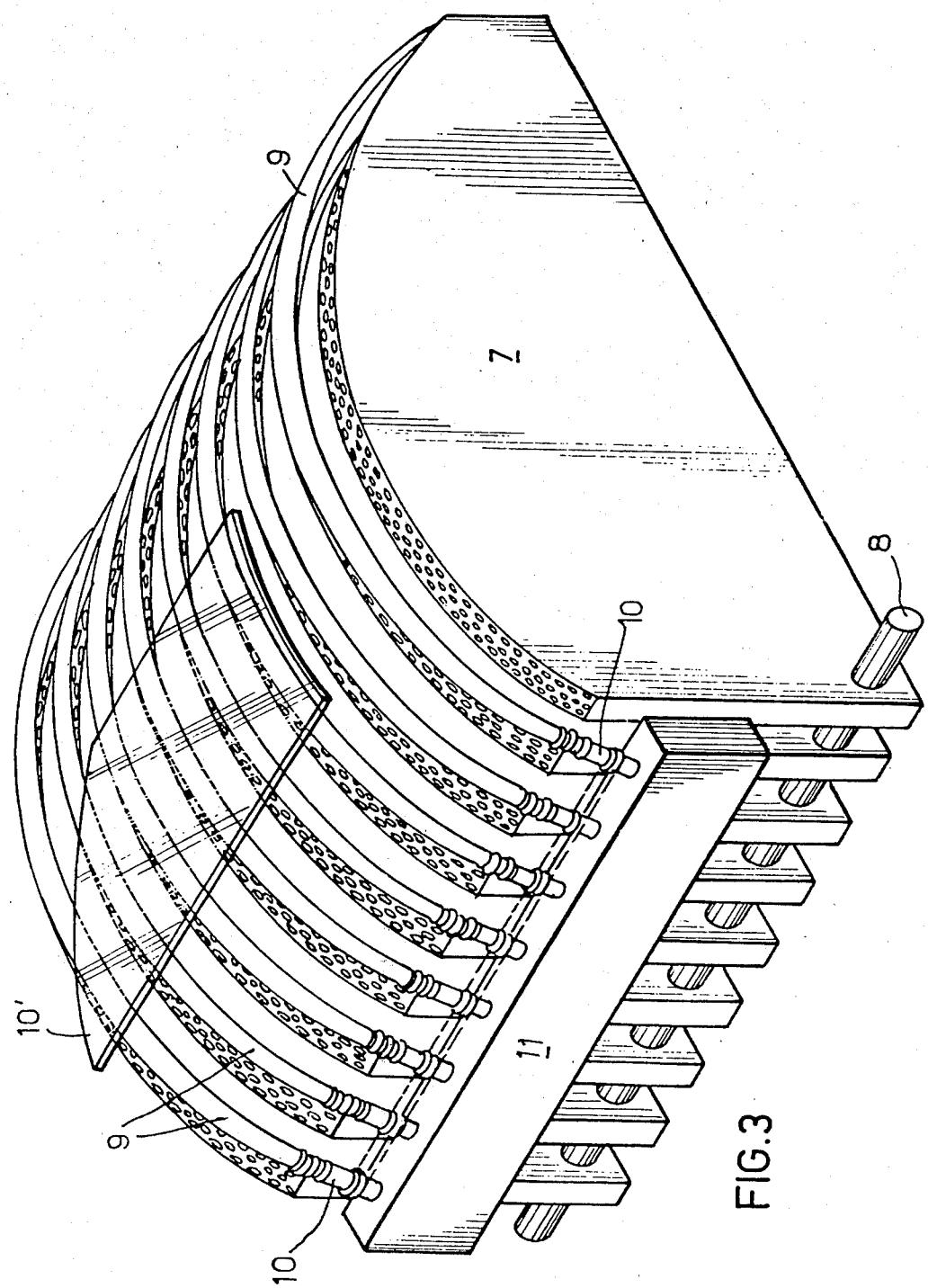
FIG. 3 illustrates a further type of bending device equipped with boxes constructed according to the invention and having bent rods equipped with driven rotatable outer casings.

As shown in FIG. 3, bent rods 9 used in the prior art and each of which is covered by a tubular rotatable casing driven at one of its ends 10 may be positioned between adjacent boxes 7. The boxes are connected together by a bar 8. The bend rods 9 have the same profile as the boxes. The bent rods 9 are carried by a framework 11 which forms a single piece with the boxes 7, and it is the complete assembly of the rods 9 and the boxes 7 together which are moved in a transverse plane, by rotation, for example, when it is desired to vary the radius of curvature. The rods 9 project slightly above the upper surface of the boxes 7 and contribute to the movement of a sheet 10' and simultaneously to the bending of the sheet. The rods 9 can also be mounted in an individual framework.

Since the modification of the curvature of the bending device is no longer brought about by inclining the rods in the direction of movement of the sheet of glass but instead by swinging or rotating the elements in a perpendicular direction, the spacing between the different elements of the bending device can be small and the perceptible optical defects which can appear in a sheet produced by the prior art can thus be eliminated.

It is preferable that the rods 9 be slightly inclined in the direction in which the sheet being treated is moving. By this means, the sheet centers itself along the axis of bending while undergoing only a slight rotation.

Furthermore, it is possible that the entire bending device need only comprise bent rods having a continuously varying curvature which are rotatable in a direction perpendicular to the direction in which the sheet of glass is moving. Those rods are then mounted on a framework which can either be an individual framework or one which is common to a group of rods, and it is the rod framework assembly which is capable of being rotated.

As explained above, it is advantageous for the upper surface of the boxes and/or the rods, either of which may be considered as elements, to have the shape of a spiral, and particularly a logarithmic spiral, for that shape lends itself to a very simple adjustment of position for the elements, and consequently to easy modification of the radius of curvature.

It is known that, in a system of polar coordinates, the equation which gives the value of the polar radius $\rho$ (distance between the origin of the coordinates 0 and a point A on a curve) as a function of the angle $\theta$ which produces that radius with the x-axis (FIG. 5) is the following:

$$\rho = k e^{m\theta},$$

with the radius of curvature R at a point on the spiral situated at a length of arc s from the origin also being proportional to that arc, in conformity with the relationship $R = ms$.

If one moves such a spiral in its plane in such a way that it always passes through a fixed point, one causes the radius of curvature to vary in a continuous manner at that point.

Accordingly, the top of a bending element which has the shape of a logarithmic spiral can be maintained at a constant level with respect to the outlet on an oven for reheating a sheet of glass while rotating the element in a plane at a right angle to movement of a sheet from the oven while at the same time causing the radius of curvature at that level to vary.

Furthermore, if the parameters k and m are chosen judiciously, one can obtain an arc having a logarithmic spiral which, over a short distance, deviates very little from an arc of a circle, thus making it possible to manufacture glass sheets having cylindrical curves or bends. Thus a spiral which conforms to the following equation turns out to be particularly advantageous:

$$\rho = 1.4883 \, e^{0.95\theta}$$

Figure 4:
FIGS. 4, 5 and 6 are diagrams illustrating the properties of a logarithmic spiral profile and the advantages of choosing such a profile for the boxes of the invention.

A spiral portion commencing with the angle $\theta_o = 6.1067$ radians allows a curve to move from an average radius R of curvature of 900 mm to 2,500 mm to produce an arc of 500 mm of a desired profile from a total length of 2,180 mm. A length for a bending element of 2,180 mm is an acceptable, easily achievable length and one which can replace the old bent rods in existing bending devices without important modifications. Furthermore, if one still is considering glass sheets of 500 mm of arc to be bent, the maximum distances to the ends of the bent portions—that is, at 250 mm from the bending axis, between the spiral and the circle $C_1$ (FIG. 4) having the average radius of the portion being bent—are $x = 1.01$ mm and $y = 1.37$ mm with an average radius of 900 mm and $x = 0.14$ mm and $y = 0.16$ mm with an average radius of 2,500 mm. Hence these distances are very slight and glass sheets bent in accordance with that profile can be considered to have cylindrical bends or curves. Naturally, within the framework of the invention, one can use a logarithmic spiral differing from the one set out above. The equation referred to above, with coefficients carried into decimals, has the advantage of leading to the obtaining of complete values for the radii of curvature and the lengths and those values correspond exactly with a range of glass products which have been manufactured and with the dimensions of devices used in manufacture of the products. Of course, a logarithmic spiral having an equation close to that proposed above—$\rho = 1.5 \, e^\theta$, for example—starting with a $\theta_o$ of approximately six radians, can be considered for approximately identical results.

Hence it is possible, when choosing elements including boxes and/or bent rods having such a logarithmic spiral profile, to cause the radii of curvature to vary within a very large range, by displacing the boxes and/or the rods in a plane at right angles to the direction in which the sheets of glass are moving.

Figure 5:
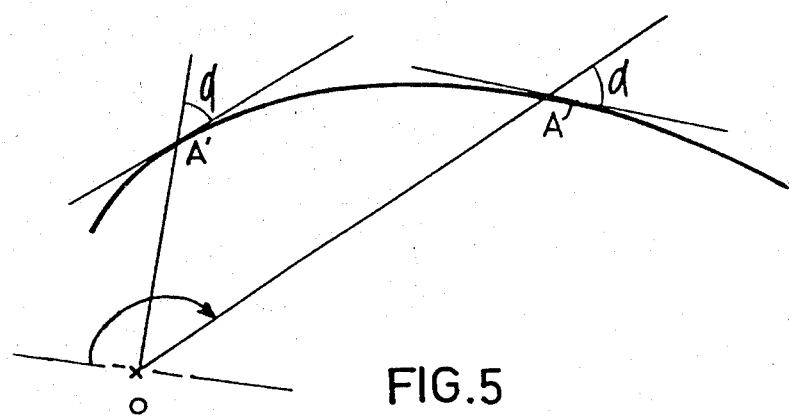

The adjustment of the position of these bending elements, boxes or rods makes use of another property of the logarthmic spiral—that is, that the angle between the polar radius OA and the tangent to the point A of the curve remains constant at all points on the spiral as shown in FIG. 5.

Figure 6:
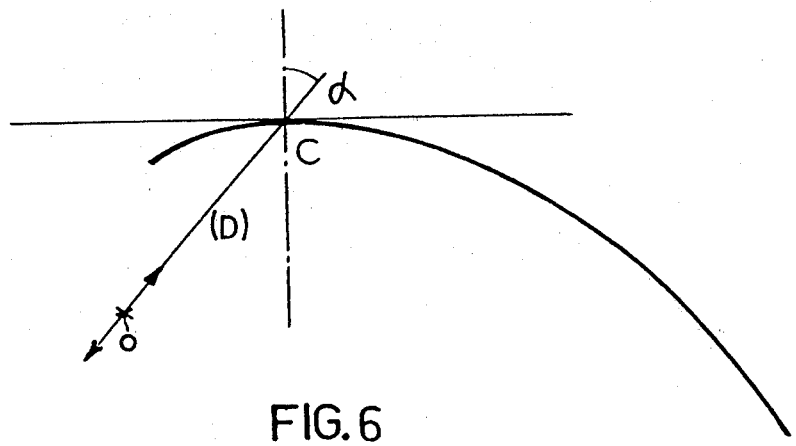

If one desires the tangent at the top C of a bending mold made up of elements including a box or rod to remain fixed when the element is displaced in a plane perpendicular to the direction in which the sheets to be treated are moving so that the element will remain tangent to the sheet, it is necessary that the axis of bending OC as shown in FIG. 6 remain fixed in the plane during the process of adjusting the element—that is, for the pole O to move on a fixed straight line forming an angle α with the horizontal.

Figure 7:
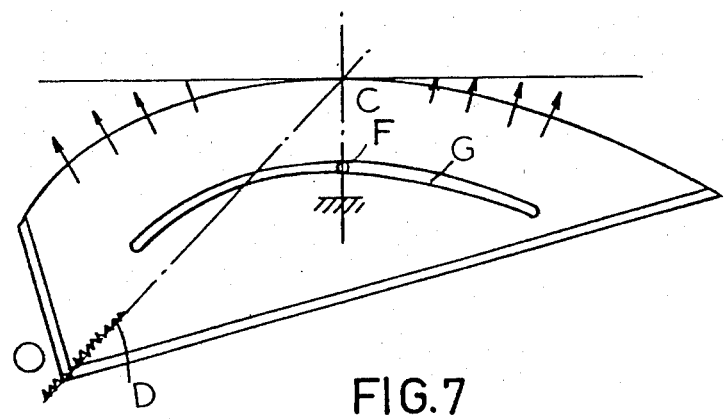
FIG. 7 illustrates a bending box constructed according to the invention having a logarithmic spiral profile and means for adjusting the position of the box relative to a fixed point.

In practice, to keep the top C of an element at a fixed point as shown in FIG. 7, a toothed rack forming a straight line D can be used for adjustment purposes and on which the pole O can move. Also a slide G is provided in the element for adjustment purposes where the slide is parallel to the spiral and into which a fixed pivot F is engaged. Any displacement of the pole O along the line D results in a swinging of the spiral—that is, in a modification of the radius of curvature R at the point C, through which the spiral continues to pass. Hence, the means of adjusting the radius of curvature of an element is very simple since it only requires the displacement of a fixed point (the pole O) of a box or framework carrying the element along a fixed straight line formed by a toothed rack D.

A bending mold formed by elements having a logarithmic spiral profile is also particularly well suited for use with the bending devices described in connection with FIGS. 1 and 2, for it makes it possible to eliminate or reduce the rotation of a sheet being bent very appreciably as the sheet moves along.

The bending devices of the invention can also be used very advantageously for hardening a sheet. In the hardening process, three functions have to be carried out simultanously, that is, the functions of supporting, transporting and cooling a sheet. With the devices of the invention, support is provided by the elements in the form of boxes or bent rods having the logarithmic profile. Cooling is obtained by blowing a gas through holes contained in the boxes and transportation is accomplished by a series of lugs and/or the driven tubular casings on the bent rods.

Figure 8:
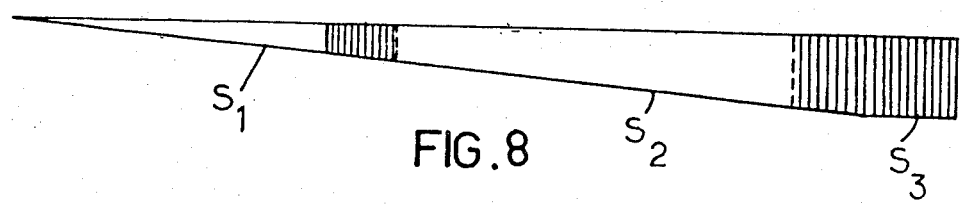
FIG. 8 is a side view of a plurality of boxes constructed according to the invention positioned together to form a base plate having an adjustable profile and gas holes therein through which a gas may flow to provide a gas cushion.

Referring to FIG. 8, there is shown a fixed base plate $S_1$ having a bending radius which moves progressively from infinity to 2,500 mm, for example, and then a base plate $S_3$, which is cylindrical and has a constant radius of curvature which is equal to 900 mm. The base plate $S_1$ is made up of a number of boxes in conformity with the invention which are identical and which are slightly offset with respect to each other so that the radius of curvature varies progressively. The bases may be locked in position if desired. The base plate $S_1$ may also comprise a base plate with a gaseous cushion consisting of a single box having holes in the upper surface through which gas is blown and where the curvature of the surface will move from infinity to 2,500 mm. In view of the fact that all bent glass products required at the present time are bent in a maximum radius of curvature of 2,500 mm, it is not a disadvantage that the base plate is fixed rather than being adjustable.

Figure 9:
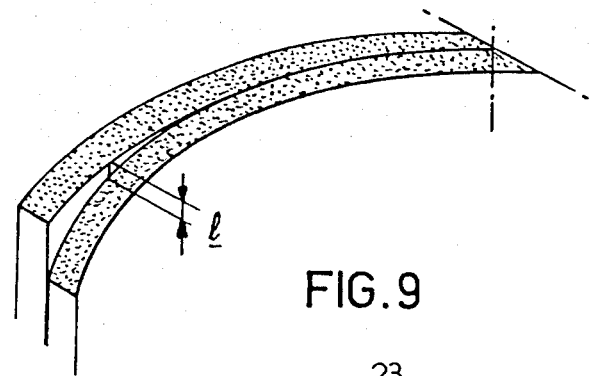
FIG. 9 illustrates the offsetting of two successive boxes of a part of the base plate of FIG. 8.

The base plate $S_2$, on the other hand, is necessarily made up of identical, adjustable boxes made in conformity with the invention, placed side by side and slightly offset with respect to each other. Each box is offset with respect to the adjoining boxes by utilizing toothed racks. As shown in FIG. 9, the steps between the adjacent boxes are of a height 1.

The base plate $S_3$ is formed by boxes which are placed side by side but which are not offset with respect to each other. They may be made integral with one another by one or more bars 8 as shown in FIG. 3 or they may consist of a single box the upper surface of which is identical with that of the group of several boxes placed side by side.

When the final radius of curvature is to be changed, the respective offsettings of the boxes of the base plate $S_2$ are changed and all the boxes comprising the base plate $S_3$ are rotated either separately the same amount or together if connected by a bar 8.

In cases where there are several boxes which have been connected together as a unit, only a single toothed rack is necessary for adjustment purposes of the unit.

The toothed racks D, the slides G or the pivots F shown in FIG. 7 can be part of the boxes, can be mounted on frames carrying boxes which are rigidly locked together or can be mounted on frames of different groups of boxes.

Movement of the sheets of glass can be accomplished by a series of lugs, bent rods or other means.

An example of a base plate as shown in FIG. 8 and which has been used comprises a plurality of boxes each having a standard thickness of 50 mm forming the fixed base plate $S_1$ with a length of 3,300 mm. The adjustable base plate $S_2$ having a length of 5,700 mm is formed by placing one hundred fourteen identical boxes side by side in offset relationship. The cylindrical base plate $S_3$ having a length of 1,000 mm is formed by stacking twenty identical boxes which are not offset. In the base plate $S_2$ the steps 1 reach at the most 0.29 mm, at 250 mm from the axis, which is of a very slight difference which a sheet of glass can easily span.

It is also possible to produce a base plate with spiral profile bent rods and particularly logarithmic spiral bent rods or with a combination of boxes and bent rods. If the hardening station is only made up of such bent rods, standard blowing means may be provided between the rods.

Figure 10:
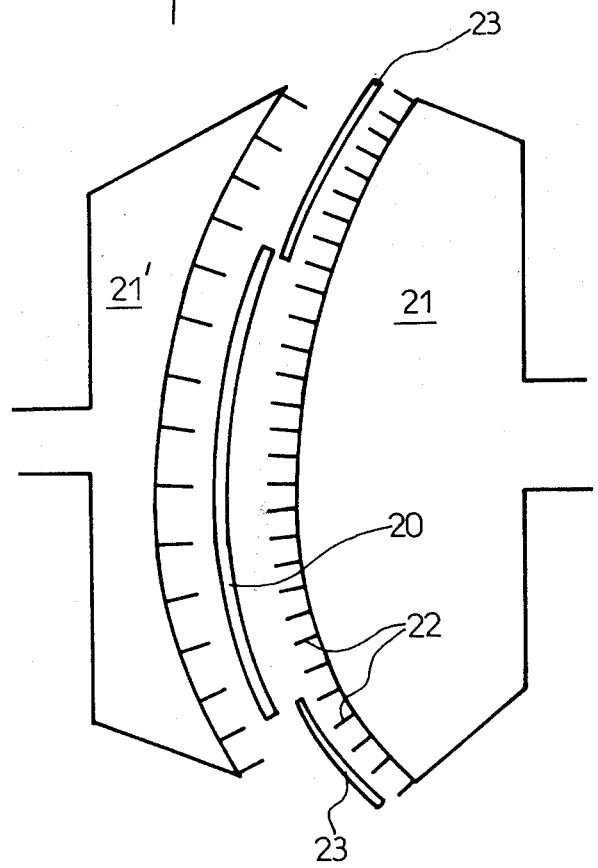
FIG. 10 is a diagram illustrating the use of a bending box constructed according to the invention for the hardening of sheets of glass movable in a vertical plane.

FIG. 10 shows a sheet of glass 20 and a box 21 having a logarithmic spiral profile made in conformity with the invention used for vertical hardening of the sheet. The box has a plurality of small nozzles 22 on its surface through which a gas can be blown in the direction of the sheet to be hardened. Flexible sealing plates 23 are provided to mask off unused nozzles. In this application, use of a single box makes it possible to harden cylindrical sheets having different radii of curvature by bringing the sheets opposite a portion of the surface of the box having an average radius corresponding to the radius of curvature of the sheet to be hardened. A second box 21' having a shape complementary to that of the first box 21 can be placed on the other side of the sheet of glass to further assist in the hardening step.

Furthermore, the shape of the boxes can vary not only in a first direction in space along a spiral, but can also vary along a spiral following a second direction in space which is perpendicular to the first direction.

In the same manner, bending of sheets of glass in a vertical position is accomplished with a mold and a counterform having either logarithmic profiles in a single direction to carry out cylindrical bending or logarithmic profiles in two directions (profile of a portion of a torus), for a bending in two different directions.

The bending elements described throughout this specification and represented in the drawings constitute bending molds or hardening boxes convex in shape, but of course the bending and/or hardening elements, whether they are bent rods or boxes, can also comprise concave molds.

Bending elements according to the invention and devices using the elements provide a simple and practical means which is applicable to bending as well as to hardening of plates of a material in a plastic state, and particularly sheets of glass, at a temperature equal to or higher than the softening temperature of glass. Sheets of glass treated using such devices having optical qualities at least equal to those obtained with prior art devices.

I claim:

1. An element for bending or hardening a movable plate of a material in a plastic state where the element is adapted to be positioned below said movable plate to support the same, characterized in that the surface of said element contacting the plate has a plurality of bending profiles taken in a plane perpendicular to the direction of movement of the plate, in that adjacent bending profiles blend smoothly with one another and in that said surface has a radius of curvature which varies in a continuous manner over the complete length of the surface, and in having adjustment means for relatively moving a plate over different longitudinal portions of said surface.

2. An element according to claim 1 further characterized in that the profile of said surface taken in a plane perpendicular to the direction of movement of the plate comprises in part a logarithmic spiral.

3. An element according to claim 2 further characterized in that said logarithmic spiral in a system of polar coordinates has an equation $\rho = 1.5e^{\theta}$.

4. An element according to claim 3 further characterized in that said spiral begins at an angle $\theta°$ of approximately six radians.

5. An element according to claim 2 further characterized in that said adjustment means turns said element in said plane while maintaining an uppermost point of the surface contacting the glass at a fixed point.

6. An element according to claim 5 further characterized in that said adjustment means includes means for displacing the pole of the spiral surface along a fixed straight line passing through said fixed point and a fixed pivot beneath the fixed point engaged in a slide contained in said element extending parallel to said logarithmic spiral.

7. An element according to claim 1 further characterized in that said element forms part of a box and wherein said box has gaseous blow holes through which gas may flow to support said plate by a gaseous film.

8. An element according to claim 1 further characterized in having in addition a bent rod including a driven rotatable casing thereon positioned slightly above said surface to impart a driving movement to the plate.

9. A device for bending or hardening a movable sheet or plate of glass in a plastic state including an element having a surface adapted to contact said sheet where said surface is in the form of a spiral over its complete length oriented toward the sheet and wherein the element is positioned at a right angle to the direction of movement of the sheet through the device and including adjustment means to impart relative movement between said plate and different longitudinal portions of said surface.

10. A device according to claim 9 further characterized in that said element forms part of a box positioned at a right angle to the direction of movement of the sheet through the device and wherein said box includes gaseous blow holes for directing a flow of gas to a surface of said sheet.

11. A device according to claim 10 further characterized in that said sheet is movable in a vertical plane in front of said box.

12. A device according to claim 9 further characterized in having in addition a counterform having a surface complimentary to the surface of said element and wherein said element and counterform are positioned vertically whereby said sheet may pass between said element and said counterform in a vertical plane.

13. A device for bending or hardening a sheet of glass in a plastic state including at least one element positioned to one side of said sheet to contact the same and means for moving the sheet through the device, characterized in that the surface of said element contacting the plate has a plurality of bending profiles taken in a plane perpendicular to the direction of movement of the sheet through the device and has adjustment means for turning each element in said plane while maintaining an uppermost point of the surface of the element contacting the sheet at a fixed point.

14. A device according to claim 13 further characterized in having a plurality of elements where each element forms part of a box and wherein all boxes are placed side by side at a right angle to the movement of the sheet through the device.

15. A device according to claim 14 further characterized in that said boxes are offset with respect to each other at right angles to the direction of movement of the sheet through the device.

16. A device according to claim 14 further characterized in that some of the boxes are offset vertically with respect to each other.

17. A device according to claim 14 further characterized in that bent rods are inserted between some of said boxes.

18. A device according to claim 13 further characterized in that the means for moving the sheet of glass through the device comprises a series of lugs.

19. A device according to claim 13 further characterized in that each said element comprises a bent rod.

* * * * *